US006959407B2

(12) United States Patent
Six

(10) Patent No.: US 6,959,407 B2
(45) Date of Patent: Oct. 25, 2005

(54) CONTEXT SAVE AND RESTORE USING TEST SCAN CHAINS

(75) Inventor: Laurent A. Six, Le Bar sur Loup (FR)

(73) Assignee: Texas Instruments Incorporated, Dallas, TX (US)

( * ) Notice: Subject to any disclaimer, the term of this patent is extended or adjusted under 35 U.S.C. 154(b) by 412 days.

(21) Appl. No.: 10/023,011

(22) Filed: Dec. 13, 2001

(65) Prior Publication Data

US 2002/0087928 A1 Jul. 4, 2002

Related U.S. Application Data

(60) Provisional application No. 60/258,818, filed on Dec. 29, 2000.

(51) Int. Cl.[7] ........ G01R 31/28
(52) U.S. Cl. ........ 714/726
(58) Field of Search ........ 714/5, 25, 29, 714/30, 710, 715, 718, 724–729, 733; 365/200, 365/201; 324/765

(56) References Cited

U.S. PATENT DOCUMENTS 6,237,054 B1 5/2001 Freitag, Jr.
6,370,664 B1 * 4/2002 Bhawmik ........ 714/729
6,715,105 B1 * 3/2004 Rearick ........ 714/30
2002/0125907 A1 * 9/2002 Kurtulik et al. ........ 324/765

OTHER PUBLICATIONS

Brown, Chuck, et al., "Reconfigurable Digital Baseband Modulation for Wireless Computer Communication," 1995 IEEE. pp. 610-616.

* cited by examiner

*Primary Examiner*—Albert Decady
*Assistant Examiner*—John J. Tabone, Jr.
(74) *Attorney, Agent, or Firm*—J. Dennis Moore; W. James Brady, III; Frederick J. Telecky, Jr.

(57) ABSTRACT

A method for providing context save and restore using a test scan chain is provided. The method includes dividing a scan chain (34) of digital logic components (24) into a plurality of sub-chains (42). A first data set is provided in the sub-chains (42). The sub-chains (42) are linked in parallel and to a hardware resource for executing an application. The sub-chains (42) are linked to a device memory (18). A first application is executed to update the first data set in the sub-chains (42). The first application is operable to use the hardware resource. The updated first data set is stored in the device memory (18). A second data set is restored from the device memory (18) to the sub-chains (42). A second application is executed to update the second data set in the sub-chains (42). The second application is operable to use the hardware resource.

1 Claim, 2 Drawing Sheets

CONTEXT SAVE AND RESTORE USING TEST SCAN CHAINS

This application claims priority under 35 USC §119(e)(1) of provisional application Ser. No. 60/258,818, filed Dec. 29, 2000.

TECHNICAL FIELD OF THE INVENTION

This invention relates generally to telecommunication devices and more particularly to a method and system for providing multi-channel functionality with a telecommunication device comprising a single channel.

BACKGROUND OF THE INVENTION

Wireless communication systems have been the subject of substantial development activity in accordance with the ever-increasing demand for better and more flexible communication devices. Wireless telephone systems are also known as portable, cordless or mobile telephone systems. A typical wireless communication system has a base station that is connected to the Public Switched Telephone Network over a wireline interface and communicates with a mobile unit or handset over an air interface that permits the user to communicate remotely from the base station.

In the past, the enhanced features and high voice quality demanded by users have been achieved by the use of sophisticated and complex algorithms and methods that require substantial processor resources and large amounts of memory. Technical problems associated with the need for using faster and more powerful processors include larger packaging to accommodate the larger-sized components. In the past, such wireless systems have been large and bulky and have weighed more than what is satisfactory to many users.

While wireless communication devices and methods have provided an improvement over prior approaches in terms of features, voice quality, cost, packaging size and weight, the challenges in the field of wireless telecommunications have continued to increase with demands for more and better techniques having greater flexibility and adaptability.

SUMMARY OF THE INVENTION

In accordance with the present invention, a method and system for providing context save and restore using a test scan chain are provided that substantially eliminate or reduce disadvantages and problems associated with previously developed systems and methods. In particular, the present invention provides a scan chain of digital logic components that are divided into a plurality of sub-chains that are linked in parallel and to a hardware resource for executing an application, and are liked to a device memory for storing data for each of a plurality of applications such that the applications may be executed one after another in a repeating cycle. The device is operable to be placed in a test mode for testing, a functional mode for executing applications, and a switch mode for switching between applications. Each digital logic component is operable to receive test data over a test line and a test clock signal while the device is in the test mode, to receive functional data over a functional line and a functional clock signal while the device is in the functional mode, and to receive functional data over the functional line and the functional clock signal while the device is in the switch mode. In this way, an existing test scan chain may be adapted to provide a hardware efficient context save and restore function.

In one embodiment of the present invention, a method for providing context save and restore using a test scan chain is provided. The method includes dividing a scan chain of digital logic components into a plurality of sub-chains. A first data set is provided in the sub-chains. The sub-chains are linked in parallel and to a hardware resource for executing an application. The sub-chains are also linked to a device memory. A first application is executed to update the first data set in the sub-chains. The first application is operable to use the channel. The updated first data set is stored in the device memory. A second data set is restored from the device memory to the sub-chains. A second application is executed to update the second data set in the sub-chains. The second application is operable to use the hardware resource.

In another embodiment of the present invention, a processing device is provided that includes a scan chain, a device memory and a state machine. The scan chain comprises a plurality of digital logic components. The device memory is operable to store a data set for each of a plurality of applications. The state machine is operable to divide the scan chain into a plurality of sub-chains, to provide a first data set in the sub-chains, to link the sub-chains in parallel and to a hardware resource for executing an application, to link the sub-chains to the device memory, to execute a first application to update the first data set in the sub-chains, to shift the updated first data set into the device memory for storage, to shift a second data set from the device memory into the sub-chains, and to execute a second application to update the second data set in the sub-chains. The first application is operable to use the channel, and the second application is operable to use the hardware resource.

Technical advantages of the present invention include providing an improved system for providing context save and restore using a test scan chain In a particular embodiment, a state machine stores data for each of a plurality of applications in a device memory. The applications are executed one at a time in a hardware resource to which the test scan chain is linked. After each application is executed, the data for that application is stored in the memory and data for another application is restored from the memory. As a result, the applications may be executed in a repeating cycle with each application having exclusive use of the hardware resource during execution.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
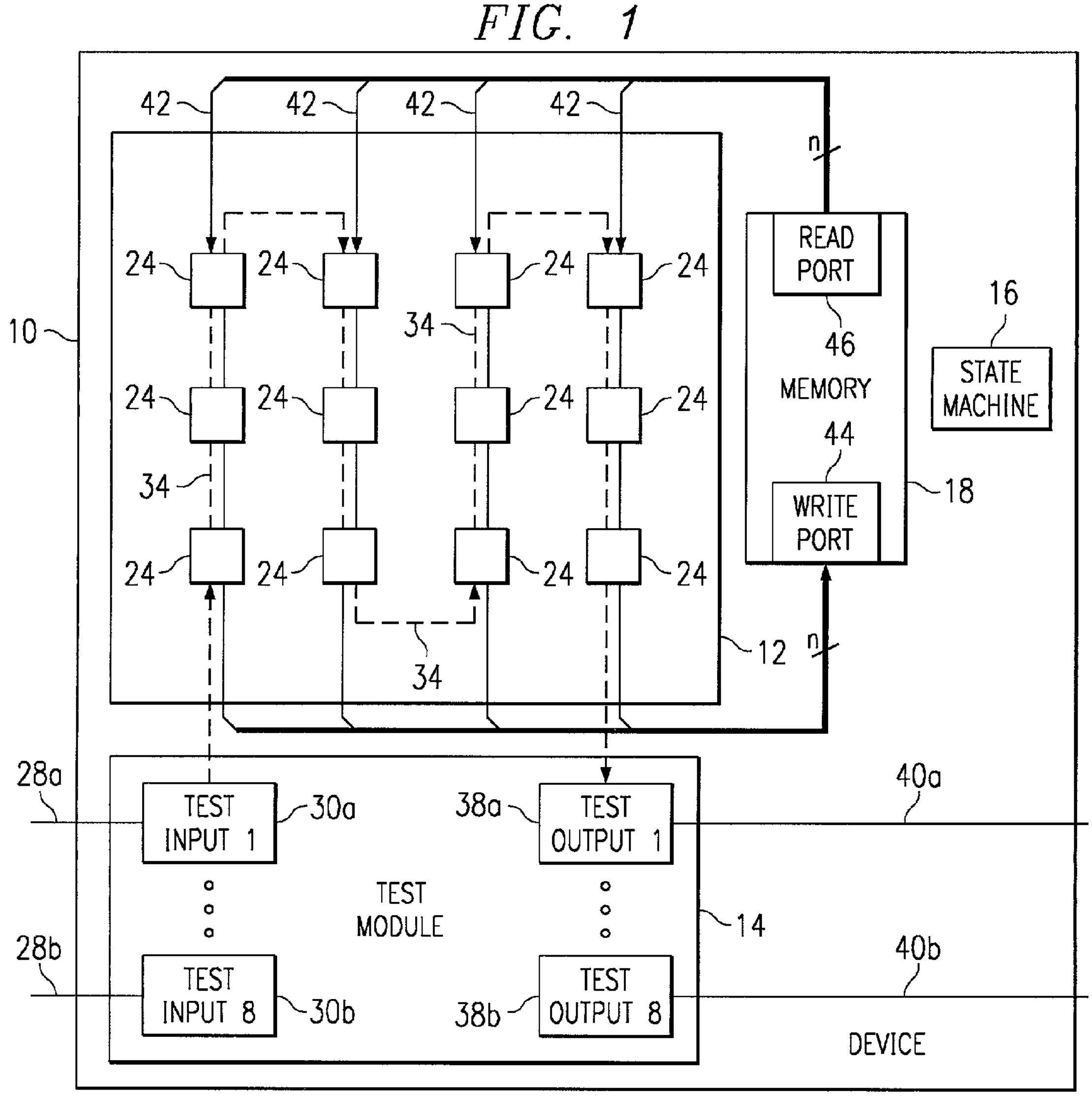
FIG. 1 is a block diagram illustrating a multi-channel device in accordance with one embodiment of the present invention.

FIG. 1 is a block diagram illustrating a telecommunication device 10 in accordance with one embodiment of the present invention. The telecommunication device 10 may comprise an application-specific integrated circuit, a field-programmable gate array, or other suitable device capable of providing telecommunication functionality. In accordance with an exemplary embodiment, the telecommunication device 10 comprises an adaptive differential pulse code modulation, or other suitable waveform codec, implemented in an application-specific integrated circuit.

According to one embodiment, the device 10 may comprise a mobile telecommunication unit operable to provide wireless communication with a base or other mobile telecommunication unit over a single communication channel. As described in more detail below, however, the single-channel device 10 is operable to provide multi-channel functionality. The device 10 may comprise part of a wireless communication system such as a cellular telephone system, local multiple distribution service, or other suitable system. For example, according to one embodiment, the device 10 is part of a wireless telephone operable to communicate with a micro-base station to provide wireless telephone service for a user.

The telecommunication device 10 comprises a hardware resource 12, a test module 14, a state machine 16, and a device memory 18. The hardware resource 12 comprises a plurality of digital logic components 24, in addition to logic circuitry, which are operable to execute an application that utilizes the single channel for the device 10. According to one embodiment, the digital logic components 24 comprise flip-flops which are operable to pass bits of data through the hardware resource 12 while an application is being executed.

The test module 14 is operable to receive, through a test data input terminal 28, input test data 30 for the flip-flops 24. The test module 14 is operable to provide the input test data 30 to the flip-flops 24 through a plurality of scan chains 34. According to one embodiment, the flip-flops 24 are linked together in eight distinct scan chains 34 such that each of the flip-flops 24 in the hardware resource 12 are included in one of the eight scan chains 34. It will be understood, however, that any suitable number of scan chains 34 may be implemented in the hardware resource 12 without departing from the scope of the present invention.

FIG. 1 illustrates one of the scan chains 34 which receives input test data 30*a* from the test module 14 for testing the flip-flops 24 that are linked together in the scan chain 34. At the end of the scan chain 34, output test data 38*a* is received by the test module 14 and provided through a test data output terminal 40*a* to allow the functionality of the flip-flops 24 in the corresponding scan chain 34 to be verified.

For the embodiment in which the flip-flops 24 and the hardware resource 12 are linked together in eight scan chains 34, input test data 30 received on input terminals 28 is provided in a similar manner from the test module 14 to each of the scan chains 34. The resulting output test data 38 from each of the scan chains 34 is also received by the test module 14 and provided through output terminals 40 for verifying the functionality of the flip-flops 24.

In accordance with one embodiment of the present invention, each of the scan chains 34 is divided into a plurality of sub-chains 42. The sub-chains 42 for each scan chain 34 are linked in parallel with each other and are linked to the device memory 18. The number of sub-chains 42 may comprise the data width, n, for the device memory 18. For example, for a device memory 18 with a data width of 16, each scan chain 34 may be divided into 16 sub-chains 42. However, it will be understood that each scan chain 34 may be divided into any suitable number of sub-chains 42 without departing from the scope of the present invention.

According to one embodiment, the device memory 18 comprises a dual port memory with a write port 44 and a read port 46. Thus, the device memory 18 may receive data from each of the sub-chains 42 through the write port 44, while providing data to each of the sub-chains 42 through the read port 46. Each scan chain 34 may have its own device memory 18 for storing data from the corresponding sub-chains 42. Alternatively, a device memory 18 may store data for the sub-chains 42 of two or more scan chains 34. However, in this embodiment, the data width for the device memory 18 is divided among each of the scan chains 34 sharing the device memory 18, decreasing the number of sub-chains 42 possible for each scan chain 34 accordingly.

The state machine 16 is operable to divide each scan chain 34 into a plurality of sub-chains 42. The state machine 16 is also operable to link the sub-chains 42 from each scan chain 34 in parallel with each other and to link the sub-chains 42 to the device memory 18. The state machine 16 is also operable to shift data from each of the sub-chains 42 into the device memory 18 through the write port and to shift data from the device memory 18 into each of the sub-chains 42 through the read port 46. The state machine 16 is also operable to execute a plurality of applications for the device 10, each of which is operable to utilize the hardware resource 12.

In operation, the state machine 16 may place the device 10 in a test mode for testing flip-flops 24, a functional mode for executing applications, and a switch mode for switching between applications. While the device 10 is in the test mode, the flip-flops 24 in the hardware resource 12 are linked together in scan chains 34. The flip-flops 24 in each scan chain 34 process input test data 30 using a test clock signal from the test module 14. The test data is passed through each of the flip-flops 24 in the scan chain 34, and output test data 38 at the end of the scan chain 34 is provided to the test module 14. The output test data 38 may then be analyzed in order to verify that the flip-flops 24 in the corresponding scan chain 34 are functioning properly.

While the device 10 is in the functional mode, the state machine 16 may execute one of a plurality of applications. In this mode, the flip-flops 24 and other logic circuitry in the hardware resource 12 are linked together in accordance with the application being executed by the state machine 16. The flip-flops 24 process functional data using a functional clock signal while the application is being executed.

While the device 10 is in the switch mode, the state machine 16 divides each scan chain 34 into sub-chains 42. The state machine 16 also links the sub-chains 42 for each scan chain 34 in parallel with each other and links the sub-chains 42 to the ports 44 and 46 of the device memory 18. The flip-flops 24 receive functional data from the device memory 18 through the read port 46 for an application to be subsequently executed when the device 10 is next placed into the functional mode. The flip-flops 24 also provide functional data to the device memory 18 through the write port 44 for the application previously executed when the device 10 was most recently in the functional mode. In addition, the flip-flops 24 use the functional clock signal while the device 10 is in the switch mode.

Thus, the state machine 16 may place the device 10 in the functional mode to execute a first application for the device 10 using the channel, place the device 10 in the switch mode to switch to a second application, and then place the device 10 in the functional mode to execute the second application for the device 10 using the channel. While in the switch mode, the state machine 16 shifts the data for the first application from the flip-flops 24 into the device memory 18 for storage. The state machine 16 simultaneously shifts the data for the second application into the flip-flops 24 from the device memory 18. Thus, when the device 10 is placed back in the functional mode, the state machine 16 may execute the second application with the appropriate data in the flip-flops 24. In this way, the state machine 16 may cycle through each of a plurality of applications, thereby allowing each application to make use of the channel.

Figure 2:
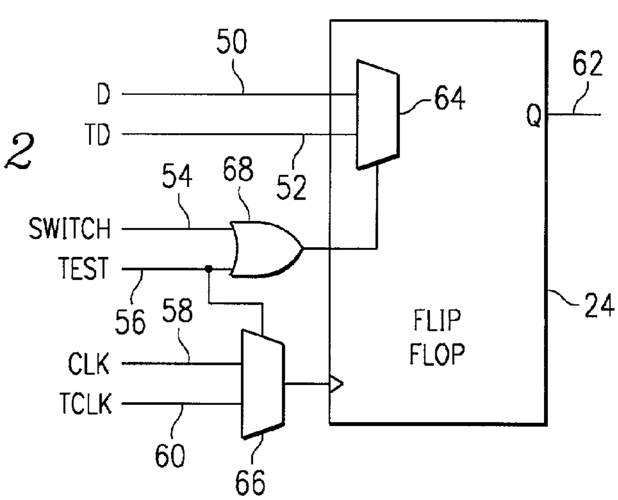
FIG. 2 is a schematic diagram illustrating a flip-flop for the multi-channel device of FIG. 1 in accordance with one embodiment of the present invention.

FIG. 2 is a schematic diagram illustrating a flip-flop 24 for the telecommunication device 10 in accordance with one embodiment of the present invention. The flip-flop 24 receives functional data through a functional data line 50 and receives test data through a test data line 52. The flip-flop 24 receives a switch signal on a switch line 54 and a test signal on a test line 56. The flip-flop 24 receives a functional clock signal on a functional clock line 58 and a test clock signal on a test clock line 60. The flip-flop 24 generates an output at an output line 62.

The flip-flop 24 comprises a multiplexer 64 for selecting between the functional data on line 50 and the test data on line 52. A multiplexer 66 provides a selection between the functional clock signal on line 58 and the test clock signal on line 60. An OR gate 68 couples the switch line 54 and the test line 56 to the multiplexer 64 in order to select the appropriate input data from line 50 or 52. The test signal on the test line 56 is also provided to the multiplexer 66 for selecting the appropriate clock signal from line 58 or 60.

In operation, when the device 10 is in the functional mode, the switch signal and the test signal are both low on lines 54 and 56. As a result, a low signal is passed from the OR gate 68 to the multiplexer 64. Based on this low signal, the multiplexer 64 selects the functional data on line 50 for processing by the flip-flop 24. The low signal on the test line 56 is also provided to the multiplexer 66, resulting in the functional clock signal on line 58 being selected for the flip-flop 24. Thus, while in the functional mode, the flip-flop 24 processes functional data on line 50 using the functional clock signal on line 58.

While in the test mode, the test signal on the test line 56 is high. As a result, a high signal is passed from the OR gate 68 to the multiplexer 64. Based on this high signal, the multiplexer 64 selects the test data on line 52 for processing by the flip-flop 24. The high signal on the test line 56 is also provided to the multiplexer 66, resulting in the test clock signal on line 60 being selected for the flip-flop 24. Thus, while in the test mode, the flip-flop 24 processes test data on line 52 using the test clock signal on line 60.

While in the switch mode, the switch signal on the switch line 54 is high. As a result, a high signal is passed from the OR gate 68 to the multiplexer 64. Based on this high signal, the multiplexer 64 selects the data on line 52 for processing by the flip-flop 24. However, the test signal on the test line 56, which is low, is provided to the multiplexer 66, resulting in the selection of the functional clock signal on line 58. Thus, while in the switch mode, the flip-flop 24 processes data on line 52 using the functional clock signal on line 58.

It will be understood that the low and/or high state of any of the signals utilized in the flip-flop 24 may be reversed to achieve the same results without departing from the scope of the present invention. Thus, any signal state for the signals may be used which results in functional data on line 50 and the functional clock signal on line 58 being processed during the functional mode, test data on line 52 and the test clock signal on line 60 being processed during the test mode, and functional data on line 52 and the functional clock signal on line 58 being processed during the switch mode.

Figure 3:
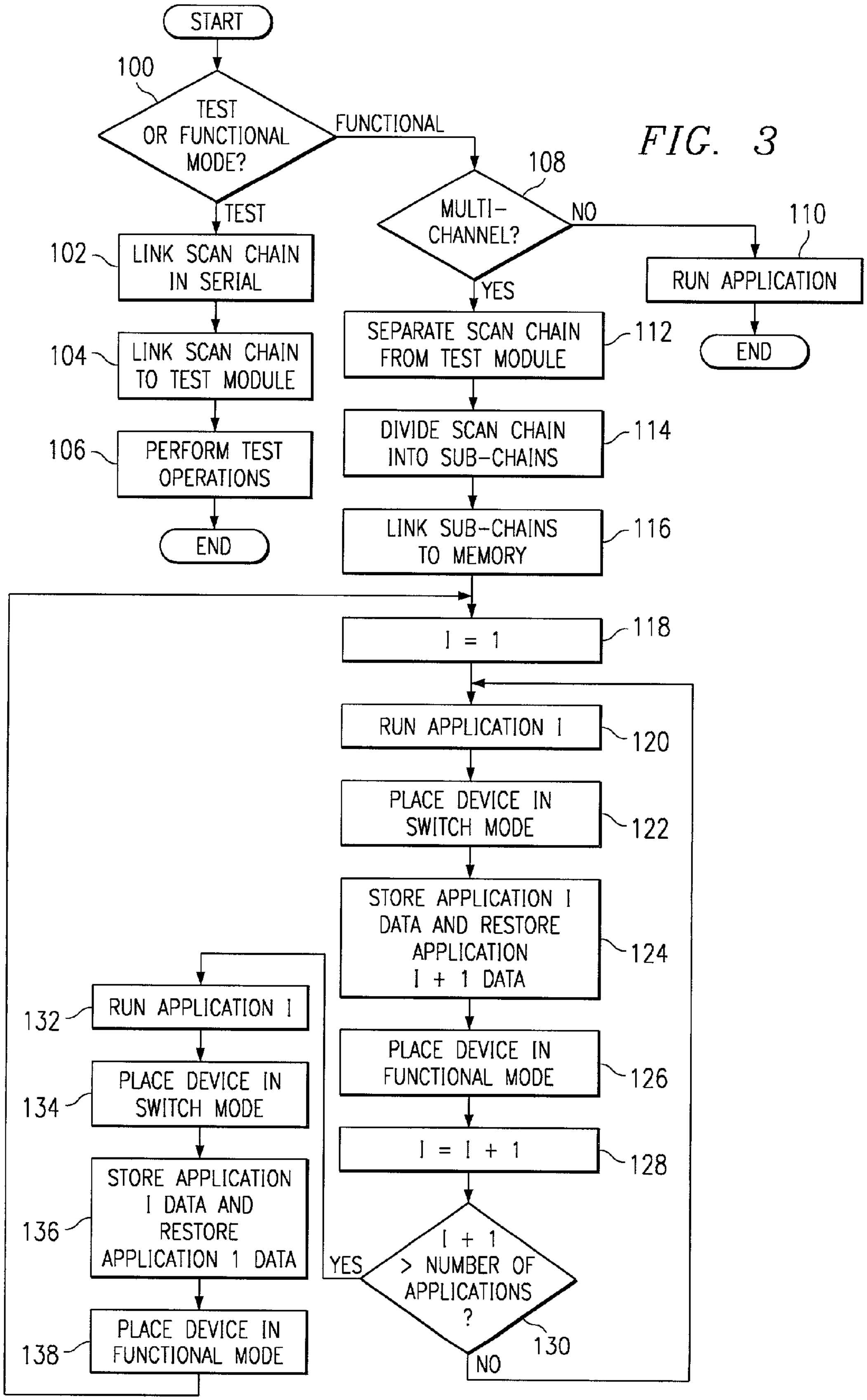
FIG. 3 is a flow diagram illustrating a method for providing multi-channel functionality with the telecommunication device of FIG. 1 in accordance with one embodiment of the present invention.

FIG. 3 is a flow diagram illustrating a method for providing multi-channel functionality with the telecommunication device 10 in accordance with one embodiment of the present invention. The method begins at decisional step 100 where the state machine 16 determines whether to place the device 10 in the test mode or the functional mode. If the device 10 is to be placed in the test mode, the method follows the Test branch from decisional step 100 to step 102.

At step 102, the state machine 16 links the flip-flops 24 of the hardware resource 12 together in serial scan chains 34, as described above in connection with FIG. 1. At step 104, the state machine 16 links the scan chains 34 to the test module 14. At step 106, test operations are performed on the flip-flops 24 in order to verify the functionality of the flip-flops 24.

Returning to decisional step 100, if the state machine 16 determines that the device 10 is to be placed in the functional mode, the method follows the Functional branch from decisional step 100 to decisional step 108. At decisional step 108, the state machine 16 determines whether the device 10 is to provide multi-channel functionality. If the device 10 is not to provide multi-channel functionality, the method follows the No branch from decisional step 108 to step 110. At step 110, the state machine 16 executes the application for the device 10.

Returning to decisional step 108, if the device 10 is to provide multi-channel functionality, the method follows the Yes branch from decisional step 108 to step 112. At step 112, the state machine 16 separates each scan chain 34 from the test module 14. At step 114, the state machine 16 divides each scan chain 34 into a plurality of sub-chains 42 based on the data width for the device memory 18. At step 116, the state machine 16 links the sub-chains 42 to the device memory 18.

At step 118, an application identifier, I, is set to one. At step 120, the state machine 16 executes Application I. At step 122, the state machine 16 places the device 10 in the switch mode. At step 124, the state machine 16 stores data for Application I in the device memory 18, while restoring data for Application I+1 from the device memory 18. At step 126, the state machine 16 places the device 10 in the functional mode.

At step 128, the application indicator is incremented by one. At decisional step 130, the state machine 16 determines whether I+1 exceeds the number of applications that are to be executed for the device 10. If I+1 does not exceed the number of applications, the method follows the No branch from decisional step 130 and returns to step 120 where the state machine 16 executes Application I, which is the application following the previously executed application.

Returning to decisional step 130, if I+1 exceeds the number of applications, Application I is the final application to be executed before cycling back to the first application. In this situation, the method follows the Yes branch from decisional step 130 to step 132 where the state machine 16 executes Application I. At step 134, the state machine 16 places the device 10 in the switch mode.

At step 136, the state machine 16 stores data for Application I in the memory, while restoring data for the first application from the device memory 18. At step 138, the state machine 16 places the device 10 in the functional mode before returning to step 118, where the application indicator, I, is reset to one.

Because the data in the flip-flops 24 for each application is stored in the device memory 18, the hardware resource 12 may be returned to the same state in which the application existed at the conclusion of the previous execution of the application in order to continue execution of the application. In this way, the state machine 16 is able to execute a plurality of applications by cycling through each application and allowing each application exclusive use of the hardware resource 12 and the channel while the application is identified by the application indicator.

Although the present invention has been described with several embodiments, various changes and modifications may be suggested to one skilled in the art. It is intended that the present invention encompass such changes and modifications as fall within the scope of the appended claims.

What is claimed is:

1. A method for providing context save and restore using a test scan chain in an integrated circuit device also having a memory and a state machine, the method comprising:

providing a scan chain of digital logic components comprised of a plurality of sub-chains;

in a test mode, providing an input test data set to the scan chain, and scanning the input test data set through the scan chain, and providing an output test data set as an output of the scan chain;

in a first switch mode, linking the sub-chains in parallel with each other and to a device memory, and reading a first functional data set from the memory;

in a functional mode, linking the digital logic components with other logic circuitry in accordance with an application to be executed by the state machine, and executing the application to generate second functional data; and in a second switch mode, linking the sub-chains in parallel with each other and to the memory;

storing the second functional data set in the memory.

* * * * *